Sept. 9, 1958  G. SOTEROPULOS  2,850,965
BALER PLUNGER MOUNTING
Filed Feb. 20, 1957
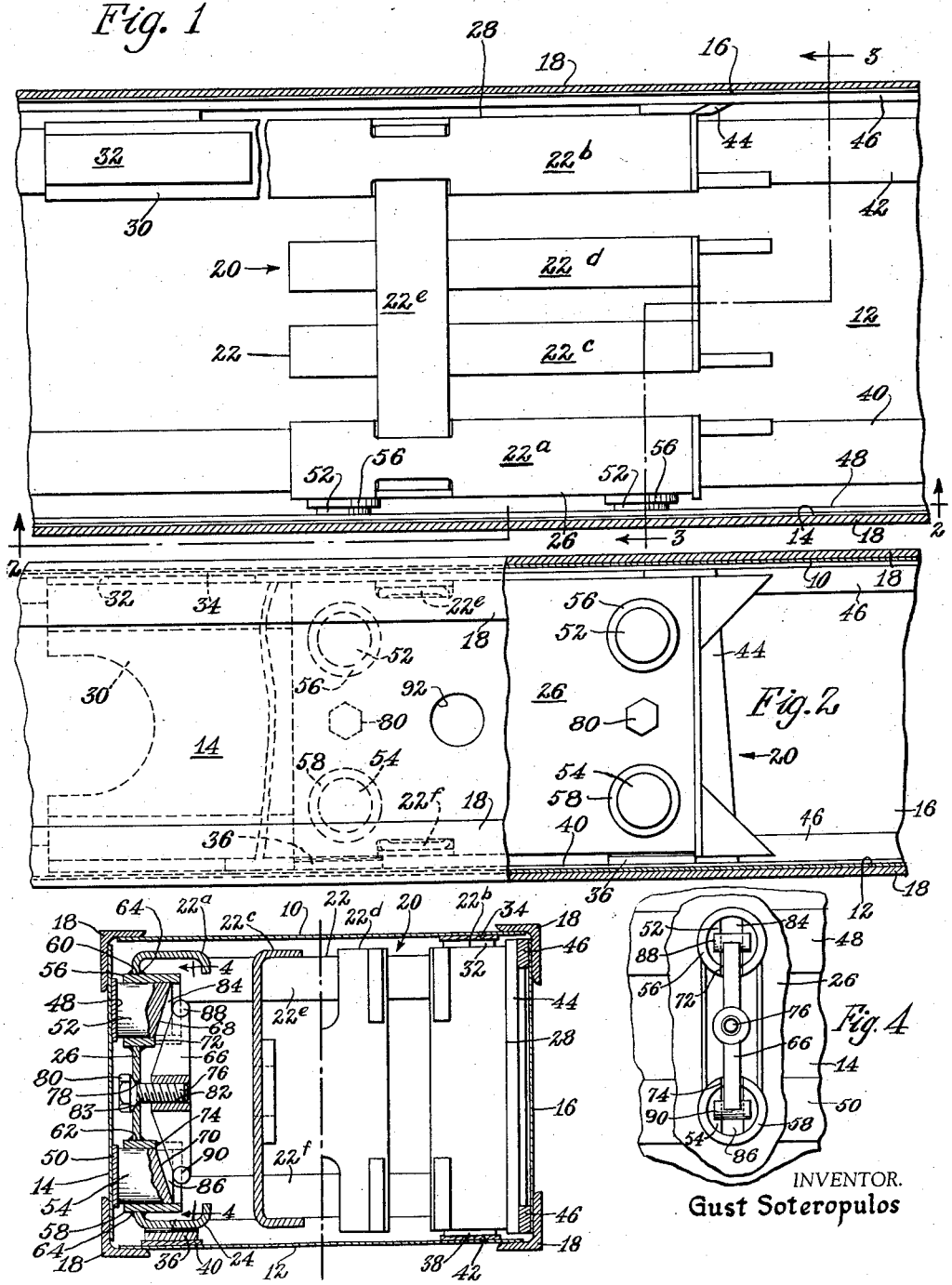
INVENTOR.
Gust Soteropulos United States Patent Office 2,850,965
Patented Sept. 9, 1958

2,850,965

BALER PLUNGER MOUNTING

Gust Soteropulos, Ottumwa, Iowa, assignor to Deere Manufacturing Co., Dubuque, Iowa, a corporation of Iowa Application February 20, 1957, Serial No. 641,398

16 Claims. (Cl. 100—179)

This invention relates to a baler and more particularly to an improved plunger mounting for guiding the plunger on its reciprocating strokes in the bale case.

In a typical agricultural baler, in which the present invention finds significant utility, a bale case of generally rectangular construction having top, bottom and opposite side walls, carries for reciprocation therein a hollow plunger which itself has top, bottom and opposite side walls respectively proximate to the corresponding walls of the bale case. It is conventional to provide guide means and wear strips for the plunger, not only to eliminate unnecessary wear on the bale case and plunger themselves but also to properly guide the plunger relative to the shearing action of the plunger-carried knife which cooperates with a stationary knife along an opening through which material is fed and across which the plunger reciprocates on alternate compression strokes, thereby shearing the incoming material so that the successive charges thereof are separated from each other.

According to the present invention, it is a significant improvement to afford a novel wear plug or equivalent element arrangement whereby a pair of spaced apart elements may be simultaneously adjusted. It is an important object in this respect to utilize an equalizer for accomplishing adjustment of the plugs. The invention features a simple and economical arrangement, and one that may be readily adjusted and maintained, and in this aspect of the invention it is a feature to provide the adjusting means in the plunger in such manner that at times the plunger may register with an access opening in the bale case so that adjustment may be effected from without the bale case. Further objects reside in novel mounting of the wear plugs, means for preventing rotation of the wear plugs, means for preventing turning of the equalizer lever, and means for obtaining the proper action of the wear plugs as the outward pressure is exerted thereon by the adjusting means.

The foregoing and other important and desirable features inherent in and encompased by the invention will become apparent as a preferred embodiment thereof is disclosed in detail, by way of example, in the ensuing specification and accompanying sheet of drawings, the several figures of which are described immediately below.

Fig. 1 is a plan view, with the upright side walls of the bale case in section so as to reveal the plunger.

Fig. 2 is a section substantially on the line 2—2 of Fig. 1.

Fig. 3 is a section on the line 3—3 of Fig. 1.

Fig. 4 is a fragmentary elevation as seen along the line 4—4 of Fig. 3.

As will be seen, the bale case itself is of generally rectangular construction, having top, bottom and opposite upright side wall means 10, 12, 14 and 16 respectively. Although these wall means are shown of substantially imperforate construction, it is conventional to provide adequate openings therein for various purposes, and in some constructions the bale case is fabricated of members which, although not continuous walls, are the equivalent of wall means by virtue of the particular arrangement of structural members. Consequently, the detailed construction of the bale case itself imports no limitations into the present invention. As shown, the bale case is reenforced at its four corners by angle bars 18.

The bale case carries for reciprocation therein a hollow plunger 20 which itself has top wall means 22, bottom wall means 24 and opposite upright side wall means 26 and 28. The plunger is made up of a plurality of appropriately flanged upright elements 22a, 22b, 22c and 22d, cross-connected by transverse members 22e and 22f. These members and elements give the plunger its hollow construction and also afford the wall means just described. Since these details are immaterial, the plunger may be considered as being made up of four rectangularly related walls. The member or element 22b extends rearwardly, as respects the direction of travel of the plunger on its compression stroke, as an extension 30 on which is suitably mounted a wear pad 32 for engagement with a wear strip 34 running lengthwise of the proximate portion of the bale case top wall 10 (Fig. 3). The bottom wall means 24 of the plunger carries appropriate pads 36 and 38 which cooperate respectively with longitudinal wear strips 40 and 42 which run lengthwise of the inner surface of the bale case bottom wall means 12. The wear strips may be of any suitable material, such as metal, whereas the wear pads are preferably of fiber material. The plunger is provided at its forward end (as respects the direction of its travel on its compression stroke), with a shearing knife 44, and this knife cooperates in conventional fashion with a material inlet opening (not shown), and serves the further function of a guide or wear means at that side of the plunger. Cooperative wear strips 46 are provided on the bale case (Fig. 3).

The foregoing is a brief outline of the fundamental guides for the plunger and in detail do not enter into a consideration of the invention. That is to say, the guides described could be of any construction without affecting the applicability of the novel structure to be presently described.

As best seen in Fig. 3, the proximate wall means 14 and 26 of the bale case and plunger respectively are proximate and parallel to each other. In this particular case, the wall means 14 and 26 are upright and, in the interests of brevity and clarity, that directional characteristic will be referred to in the description of the invention. However, as will be obvious, the arrangement may be otherwise disposed, as horizontal or at an angle. Consequently, the directional expressions are illustrative only and not limiting. With the foregoing in mind, it will be seen that the upright side wall means 14 of the bale case has upper and lower longitudinal wear strips 48 and 50, and the plunger carries upper and lower wear elements or plugs 52 and 54 which have their outer ends bearing against or riding on the wear strips 48 and 50, respectively. As seen in Fig. 2, there is a second set of plugs 52—54, but since the two sets are the same, only one set will be described.

The plugs are preferably cylindrical and are disposed with their axes parallel and normal to the line of reciprocation of the plunger, or perpendicular to the plunger wall 26. The mounting means for the plugs comprises upper and lower sleeves or tubular members 56 and 58 which are respectively received in circular apertures 60 and 62 formed in the plunger wall 26. The sleeves are welded to this wall, or otherwise rigidly secured, as at 64. The sleeves thus afford upper and lower bearing or mounting means for carrying the plugs 52 and 54 for inward and outward sliding respectively away from or toward the bale case wear strips 48 and 50.

In view of the described mounting of the wear plugs 52 and 54, and since the plunger is hollow, at least in the zone of the plugs, the inner ends of the plugs face the interior of the plunger and in this area are engaged by an equalizer member or lever 66 which has opposite ends respectively engaging the inner ends of the wear plugs, which inner ends are ramped in outwardly convergent relationship to the wall means 26, as at 68 and 70, respectively. As best shown in Fig. 4, the equalizer 66 is preferably in the form of a bar and the sleeves 56 and 58 are axially slotted, respectively at 72 and 74, and these slots receive the equalizer to permit movement thereof axially as respects the plugs but to prevent turning movement of the equalizer about a transverse intermediate axis on which the equalizer is carried at its central portion by means of a screw member 76 passed through an aperture 78 in the plunger wall 26. The screw member has an external head 80, in the sense that it is outside the plunger proper, and is further threaded into a tapped bore 82 in the intermediate portion of the equalizer. The underside of the screw member head 80 is of generally conical configuration at 83 and the aperture 78 may be complementarily recessed, which enables rocking of the screw member and equalizer 66 as a unit about an axis normal to the axis of the screw member. Since the opposite end portions of the equalizer 66 are received respectively in the sleeve slots 72 and 74, the equalizer is held against turning while the screw member 76 is tightened or loosened. The end portions of the equalizer are also received in slots 84 and 86 respectively at the inner ends of the plugs 52 and 54, and this construction prevents rotation of the plugs.

Opposite ends of the equalizer 66 carry cross members in the form of cylindrical lugs 88 and 90 which respectively ride the inner ends of the plugs 52 and 54.

Access to the screw member 76 from the exterior of the bale case is achieved by the provision in the bale case wall 14 of an access opening 92. In operation, the plunger is moved manually until one or the other of the screw members 76 is in register with the access opening 92, and a suitable tool, such as a socket wrench, may be inserted through the opening 92 to receive the head 80 of the member 76. After one set of plugs is adjusted, the plunger may be moved again so that the other head 80 is in register with the access opening 92. As will be clear, tightening of the screw member 76 draws the equalizer 66 outwardly toward the plunger wall 26 and the opposite end portions 88 and 90 of the equalizer, respectively engaging the plunger wear plugs 52 and 54, move these plugs or elements laterally outwardly and do so simultaneously. Any inequalities in movement are accommodated by the rocking motion permitted to the equalizer and screw member because of the conical configuration of the underside of the head 80.

The wear strips 48 and 50 may be of any suitable material, such as steel. The plugs 52 and 54 may also be of steel, preferably induction hardened at their outer ends which engage the wear strips 48 and 50. The slots 84 and 86 in the plugs not only receive the opposite end portions of the equalizer 66, but do so loosely and avoid interference between the equalizer and plugs as adjustment is being effected, direct contact between the equalizer and the plugs being made by the equalizer end portions 88 and 90.

Features of the invention not categorically enumerated will undoubtedly occur to those versed in the art, as will many modifications and alterations in the preferred embodiment disclosed, all of which may be achieved without departure from the spirit and scope of the invention.

What is claimed is:

1. In a baler having a bale case of generally rectangular construction including top, bottom and opposite upright side wall means, the improvement comprising: a generally hollow plunger reciprocable in the bale case and having top, bottom and opposite upright side wall means respectively proximate to the corresponding bale case wall means; means on one side wall means of the plunger providing upper and lower transverse supports opening outwardly to the proximate bale case side wall means and opening to the interior of the plunger; upper and lower wear plugs transversely movably carried respectively by the upper and lower supports and having outer ends engageable respectively with upper and lower upright portions of said one side wall means of the bale case and inner ends facing the interior of the plunger; a generally upright equalizer member within the plunger and having opposite ends respectively engaging the inner ends of the wear plugs; and pressure-exerting means cooperative between the plunger and an intermediate portion of the equalizer member for adjusting said equalizer member transversely to apply transverse outward pressure simultaneously to the plugs.

2. The invention defined in claim 1, including: upper and lower wear strips secured to and running lengthwise of said one side wall means of the bale case respectively in register with and engaged by the outer ends of the wear plugs.

3. The invention defined in claim 1, in which: said means affording the wear plug supports includes upper and lower apertures through said one side wall means of the plunger and said supports comprise upper and lower transverse sleeves received coaxially by the respective apertures and rigidly secured to said one side wall means of the plunger, said sleeves coaxially carrying the respective wear plugs.

4. The invention defined in claim 1, in which: one of the bale case wall means has an access opening therethrough; and said pressure-exerting means on the plunger is arranged for register at times with said opening to enable operation of said pressure-exerting means from without the bale case.

5. The invention defined in claim 1 including: means cooperative respectively between the ends of the equalizer member and the inner ends of the wear plugs to prevent turning of said plugs about their axes.

6. The invention defined in claim 1, in which: the pressure-exerting means includes a member turnable about an axis parallel to the plug axes; and the equalizer lever and at least one plug support include cooperative interlocking portions limiting turning of the equalizer member about said member axis.

7. The invention defined in claim 1, in which: the inner ends of the plugs are ramped in outwardly convergent relation to said one wall means of the plunger.

8. The invention defined in claim 1, in which: each plug support is a cylindrical sleeve on a transverse axis; each plug is cylindrical and is coaxially slidably received by its sleeve; the pressure-exerting means is carried by the plunger on a transverse axis parallel to and centrally of the sleeve axis and includes a member turnable on said transverse axis; the inner end portions of the sleeves are axially slotted; and the end portions of the equalizer member are respectively received by the slotted sleeves to hold the equalizer member against turning when the force-exerting member is turned about its axis.

9. The invention defined in claim 1, in which: said one side wall means of the plunger has an aperture therethrough intermediate the supports; the equalizer member has a tapped bore coaxial with said aperture; and said pressure-exerting means comprises a screw member extending through said aperture and threaded into the tapped bore and having a head abutting the outside of said one side wall means of the plunger, said head affording means for turning said screw member to draw the equalizer member toward said one side wall means of the plunger.

10. The invention defined in claim 9, in which: said one bale case side wall means has an access opening therethrough registrable with said aperture to enable access to the head of the screw member.

11. The invention defined in claim 9, in which: the inner portion of said head that engages said one side wall means of the plunger is of generally conical configuration to enable limited rocking of the screw member and equalizer member.

12. In a baler having a bale case of generally rectangular construction including top, bottom and opposite upright side wall means, the improvement comprising: a plunger reciprocable in the bale case and having top, bottom and opposite upright side wall means respectively proximate to the corresponding bale case wall means; means on one side wall means of the plunger providing a pair of spaced apart transverse supports opening outwardly to the proximate bale case side wall means and opening to the interior of the plunger; wear elements transversely movably carried respectively by the supports and having outer ends engageable respectively with correspondingly spaced apart portions of certain wall means of the bale case; an equalizer member having opposite ends respectively engaging the wear elements; and pressure-exerting means cooperative between the plunger and an intermediate portion of the equalizer member for adjusting said equalizer member transversely to apply transverse outward pressure simultaneously to the wear elements.

13. The invention defined in claim 12, including wear strips secured to and running lengthwise of said certain wall means of the bale case respectively in register with and engaged by the outer ends of the wear elements.

14. The invention defined in claim 12, in which: said one side wall means of the plunger has an aperture therethrough intermediate the supports; the equalizer member has a tapped bore coaxial with said aperture; and said pressure-exerting means comprises a screw member extending through said aperture and threaded into the tapped bore and having a head abutting the outside of said one side wall means of the plunger, said head affording means for turning said screw member to draw the equalizer member toward said one side wall means of the plunger.

15. The invention defined in claim 14, in which: one bale case wall means has an access opening therethrough registrable with said aperture to enable access to the head of the screw member.

16. The invention defined in claim 14, in which: the inner portion of said head that engages said one side wall means of the plunger is of generally conical configuration to enable limited rocking of the screw member and equalizer member.

No references cited.